United States Patent [19]

Libertini

[11] 4,253,953

[45] Mar. 3, 1981

[54] CENTRIFUGAL OIL FILTER

[75] Inventor: Zoltan L. Libertini, Stamford, Conn.

[73] Assignee: Avco Corporation, Stratford, Conn.

[21] Appl. No.: 51,948

[22] Filed: Jun. 25, 1979

[51] Int. Cl.³ ............................................. B01D 33/00
[52] U.S. Cl. ................................. 210/168; 210/360.1; 233/24
[58] Field of Search ................... 210/168, 360, 360 R, 210/358, 359, 369, 370, 374, 398; 233/23, 24

[56] References Cited

U.S. PATENT DOCUMENTS

| | | | |
|---|---|---|---|
| 1,811,157 | 6/1931 | Schwerdtfeger | 233/24 |
| 1,973,607 | 9/1934 | Bunn, Jr. | 210/360 |
| 3,075,693 | 1/1963 | Deja | 210/360 |
| 3,148,146 | 9/1964 | Asnes et al. | 233/24 |
| 3,363,771 | 1/1968 | Walters | 210/360 |
| 3,415,383 | 12/1968 | Earle, Jr. et al. | 210/168 |
| 3,437,208 | 4/1969 | Kasper et al. | 210/360 |
| 3,572,582 | 3/1971 | Seielstad, Jr. | 210/168 |
| 3,599,792 | 8/1971 | Strupp | 210/168 |
| 3,933,638 | 1/1976 | Isley | 210/360 |
| 4,098,696 | 7/1978 | Humphrey et al. | 233/24 |

Primary Examiner—Theodore A. Granger
Attorney, Agent, or Firm—Ralph D. Gelling

[57] ABSTRACT

A centrifugal oil filter for removing contaminant particles from a pressurized fluid medium includes a cylindrical drum concentric with and fixedly secured to a rotational shaft, with an annular disc being disposed within and rotatable with the drum. The disc is centered within the drum and spaced from the internal circumferential surface of the drum so as to partition the drum into two radial passageways interconnected at said internal circumferential surface. The latter is of irregular configuration to define an annular collection zone for collecting contaminant particles centerfuged outwardly by rotation of said drum. Pressurized fluid medium is provided to one radial passageway, flows past the annular collection zone where the contaminant particles are centerfuged and entrapped in the irregular internal circumferential surface of the drum, after which the pressurized fluid medium is forced radially inwardly through the other radial passageway and out of the centrifugal oil filter.

4 Claims, 4 Drawing Figures

U.S. Patent     Mar. 3, 1981     4,253,953
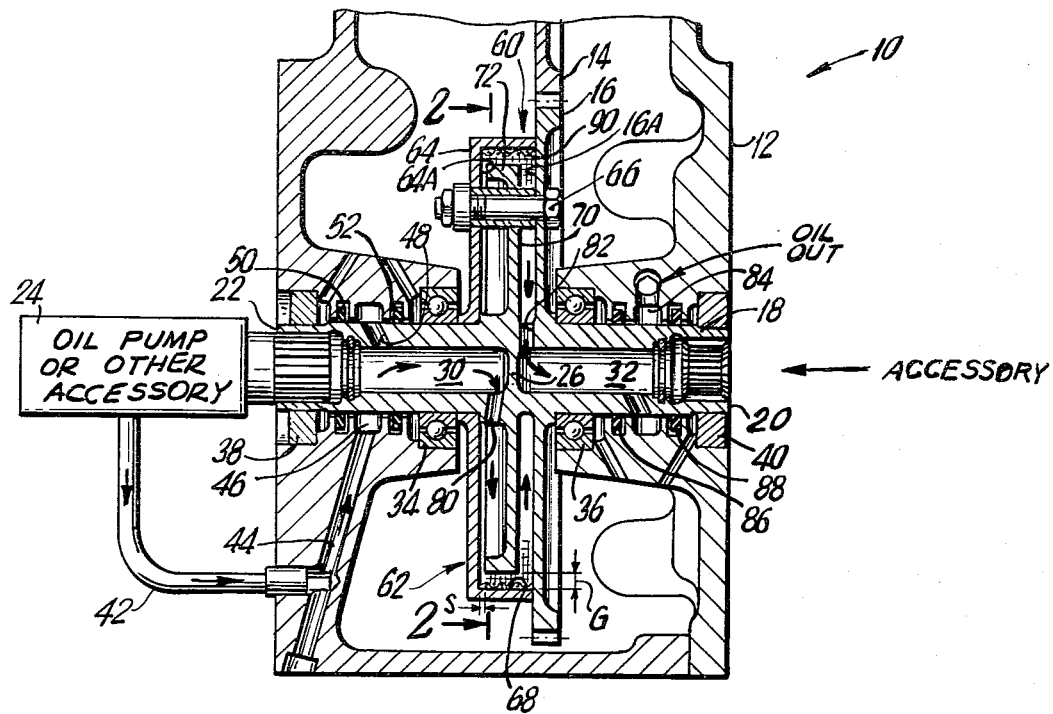
FIG. 1
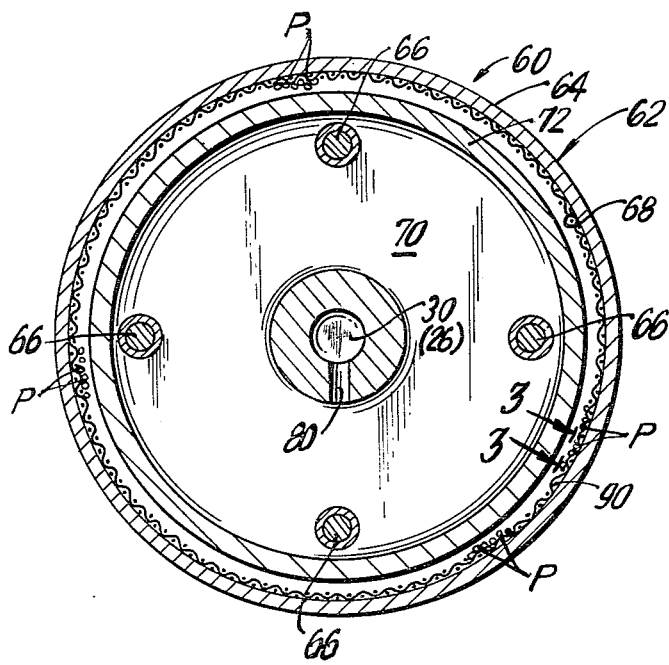
FIG. 2
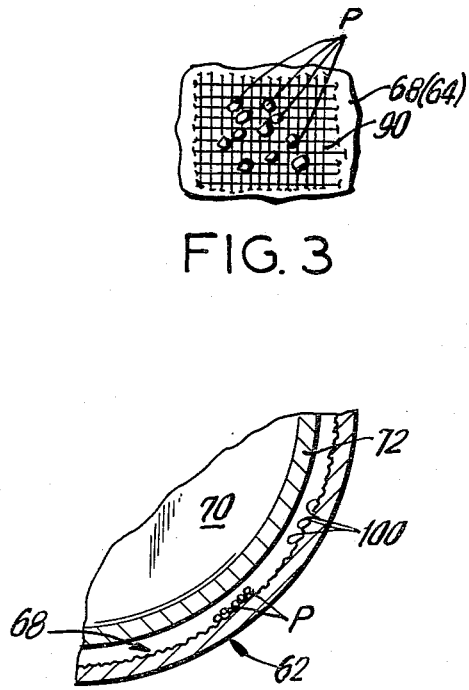
FIG. 3
FIG. 4

CENTRIFUGAL OIL FILTER

The subject invention relates to a new and improved centrifugal filter for removing contaminant particles from the pressurized fluid medium in a lubrication system, and more particularly, a centrifugal filter having increased capacity for removing both large and small contaminant particles from a pressurized fluid.

Conventional lubrication filter systems, such as in the lubrication system of an aircraft jet engine, employ separate and distinct filter units which are disposed in the conduit extending between the oil pump and the parts to be lubricated. Each filter unit basically includes a conventional barrier-type filter which is usually in the form of a screen member having a plurality of precise holes which are designed to entrap contaminant particles carried by the pressurized lubricant. After a period of use, the contaminant particles trapped by the filter clog the holes, thereby reducing the passage area for the pressurized fluid medium through the filter, and thereby necessitating periodic cleaning or replacement of the cartridge filter in order to preclude the development of a pressure drop within the pressurized lubricating system. As is readily apparent, the amount of passageways or openings in the filter, in terms of area, is small compared to the overall size of the filter. Furthermore, the size of the precise holes or openings governs the size of contaminant particles which will be filtered from the pressurized fluid medium. Usually, very fine particles, on the order of three microns, are not captured by conventional cartridge filter from the pressurized lubricated fluid.

Other factors influencing the efficiency of a conventional cartridge filter include the temperature of the lubricant as it is circulated through the lubrication system, as well as the frequency of changing or cleaning of the cartridge filter.

Accordingly, it is the object of the invention to provide a new and improved filter for removing contaminant particles from a pressurized fluid medium, and in particular, a centrifugal filter which does not rely on entrapment of particles through discrete openings in a cartridge filter.

It is a further object of the invention to provide a centrifugal filter which does not rely on relatively movable parts in order to effect separation of contaminant particles from the pressurized fluid medium.

It is still a further object of the invention to provide a centrifugal filter which is capable of filtering relatively large and very fine contaminant particles from a pressurized fluid medium.

It is another object of the invention to provide a centrifugal filter having greater capacity for removing contaminant particles from a fluid medium without requiring frequent maintenance of the filter, and without causing pressure drops in the flow of the pressurized fluid medium.

It is a further object of the invention to provide a filter for removing contaminant particles from a pressurized fluid medium which does not require separate and distinct, and rather bulky, cartridge filters which take up relatively large volumes within an aircraft jet engine, and which are susceptible to damage when employed in military aircraft.

The above and further objects and advantages of the invention will become apparent from a reading of the following detailed description taken in conjunction with the drawings in which:

FIG. 1 is a partial sectional view of a gearbox including the centrifugal filter of the subject invention;

FIG. 2 is a cross-sectional view taken along line 2—2 in FIG. 1;

FIG. 3 is a plan view of the screened annular collection zone of the centrifugal filter illustrated in FIGS. 1 and 2, and taken along line 3—3 in FIG. 2; and FIG. 4 is a partial cross-sectional view of an alternate embodiment of the centrifugal oil filter of the subject invention.

Turning to FIGS. 1 and 2, the centrifugal filter of the subject invention is embodied in the main gear box 10 of an engine, such as an aircraft gas turbine engine, with the main gear box 10 including an outer housing 12, a driving gear 14, and a driven gear 16. The latter is formed integral with an elongated hollow drive shaft 18, the ends 20 and 22 of which are splined to the oil pump 24 or accessories (not shown). The oil pump 24 drives the pressurized fluid medium of the lubrication system of the engine. Hollow shaft 18 includes an intermediate wall 26 dividing the interior of the shaft into a first input pasageway or chamber 30 and a second, output passageway or chamber 32. Shaft 18 is supported by means of bearings 34 and 36, with the gear box housing 12 being sealed to shaft 18 by seals 38 and 40. Pressurized lubricant containing contaminant particles is provided from the lubrication reservoir (not shown), is pressurized by oil pump 24, and provided by conduits 42 and 44 to an input annulus 46 which is in communication with the first input chamber 30 by means of radial passageway 48. The annulus 46 is sealed on opposite ends thereof by means of seals 50 and 52.

The centrifugal filter of the subject invention is generally designated by the numeral 60 and includes a drum 62 which has a cylindrical member 64 that is bolted as at 66 to the gear 16 such that the drum 62 is rigidly fixed to and rotates with the driven gear 16, as well as the hollow shaft 18. Also formed integral with the shaft 18 and forming a portion of centrifugal filter 60 is a disc 70. Accordingly, drum 62 and disc 70 are fixedly secured to and rotational with the shaft 18.

Annular disc 70, as shown in FIGS. 1 and 2, is of smaller diameter than the internal diameter of the drum 62, with the plane of the disc 70 being disposed intermediate the internal, annular surfaces 64A and 16A of drum 62. Further, annular disc 70 includes an annular, peripheral flange 72 which is disposed perpendicular to the plane of the annular disc. The annular flange 72 is spaced from the inner circumferential surface 68 of the drum 62 thereby defining a gap, designated by the letter "G". The end of flange 72 extends parallel to the inner circumferential surface 64A of the drum 62 thereby defining a second gap, designated by the letter "S".

By this construction, the annular disc 70 effectively divides the centrifugal filter 60 into two annular, radial passageways for the flow of pressurized fluid medium, and thus functions as a form of partition for the annular drum 62.

The input chamber 30 within the hollow shaft 18 is in communication with the drum 62 by means of radial hole 80 (see FIG. 2) and, in turn, the drum 62 is in communication with the output chamber 32 by hole 82. From outlet chamber 32 pressurized oil is provided to conduits (not shown) extending to the lubricated parts of the engine via second annulus 84. From the lubricated parts, the pressurized oil is returned to the reservoir. Annulus 84 is sealed at opposite sides thereof by means of seals 86 and 88. Any oil which leaks out of the hollow shaft, or out of the drum 62 is captured within the housing 12 of the main gear box, with suitable scavenging means being provided for redirecting the scavenged oil back to the main reservoir of the lubrication supply system for the engine.

As shown in FIGS. 1 and 2, the internal circumferential surface 68 of the drum 62 is of an irregular configuration, and defines an annular collection zone for collecting contaminant particles centerfuged outwardly by rotation of the drum. In the embodiment as shown in FIGS. 1–3, the irregular internal circumferential surface 68 of the drum is achieved by means of a screen 90 which preferably extends between the internal, annular surfaces 16A and 64A of the drum, and is of a length corresponding to the circumference of the internal surface 68 of the drum. The screen 90 may be simply placed within the drum, and held in such position by virtue of the centrifugal forces acting on the drum during rotation of the hollow shaft 18. The screen 90 may consist of a single mesh, or a plurality of mesh screens overlapping one another so as to increase the number of voids or spaces for the entrappment of contaminant particles which are centrifuged outwardly during rotation of the drum as the pressurized lubricating oil or fluid medium is conducted through the centrifugal filter 60.

In the alternate embodiment of the subject invention as shown in FIG. 4, the internal circumferential surface 68 of the drum may be made irregular or roughened by the provision of a plurality of grooves or cuts 100, which cuts or grooves may be of regular or irregular pattern or configuration.

During operation of the centrifugal filter 60 of the subject invention, pressurized oil having contaminant particles is provided from the oil reservoir to the oil pump 24 and is forced through conduits 42, 44 and thence through the first annulus 46 into the input chamber 30 of the hollow rotating shaft 18. By virtue of the centrifugal forces of the high speed rotating assembly, as well as pressurization of the lubricant, the lubricant passes outwardly through the radial slot 80 to the annular passageway defined between annular surface 64A and one side of the annular disc 70. As the pressurized oil is centerfuged outwardly it encounters the annular flange 72 and is then forced to pass through the gap "S", at which time the pressurized oil is redirected in a direction generally parallel to the concentric axis of the centrifugal filter. As the oil flows through the gap "G" past the screen 90, contaminant particles P within the lubricant, by virtue of the centrifugal force being applied thereto, are forced radially outwardly and become entrapped in the irregular surfaces of screen 90. The pressurized oil continues to pass through the gap "G" between the annular disc 70 and the internal circumferential roughened surface 68 of the drum, and then flows radially inwardly between the annular disc 70 and the surface 16A. The pressurized oil exits from the drum via aperture 82 to the output chamber 32. From the output chamber within the hollow shaft 18, the pressurized oil exits from the centrifugal filter through the annulus 84.

It is noted that as the pressurized oil is forced radially outwardly through the annular space defined between the surface 64A and the disc 70 it encounters the radial inner portion of the flange 72, at which point contaminated particles P may be entrapped. As further quantities of pressurized oil are passed through the subject filter, the oil is forced through the gap "S" such that it is effectively splurged over the end of the flange 72 and the entrapped particles P are then entrapped in the screen 90. The centrifugal force acting on the high speed rotational centrifugal filter along with the irregular annular collection zone causes adherence of the particles P to the screen 90. The spacing "G" between the annular disc and the inner surface 68 of the drum 62 is sized to insure the free flow of lubricant therethrough so as to preclude the development of pressure drops, yet is of sufficient size such that as the lubricating oil passes therethrough, particles P may be centrifuged outwardly to become entrapped in the screen 90. Generally on the first cycle of the lubricating oil through the centrifugal filter 60, the larger particles P will be centerfuged out and become entrapped in the screen 90. In subsequent cycles of the lubricating oil through the filter, smaller particles will become entrapped in the screen 90. As is readily apparent, by virtue of the high speed rotation of the centrifugal filter, even small particles on the order of several microns have sufficient kinetic energy to be forced radially outwardly toward the screen 90.

Accordingly, there is provided a new and improved centrifugal oil filter which does not rely on relatively movable parts in order to effectively separate contaminant particles from the pressurized lubricant. In addition, the subject centrifugal oil filter does not require a separate and distinct filter cartridge having openings through which the lubricating oil must be passed, and by virtue of the relatively large surface circumference of the screen 90, or the roughened internal circumference surface 68 (100), the annular collection zone of the subject centrifugal filter is relatively large, whereby frequent periodic maintenance of the centrifugal filter is not required. Furthermore, by virtue of the two part construction of the drum 62, tubular member 64 may be readily detached from the gear 16 by removal of bolts 66, thereby providing access to the annular collection zone for removal of particles P from the screen 90. Still further, the centrifugal oil filter of the subject invention may be readily embodied in the standard gear box of an aircraft engine where it is less vulnerable to destruction from outside forces, and where it does not take up relatively large volumes within the aircraft engine.

Although the invention has been described with respect to a specific embodiment thereof, it is readily apparent that various modifications or alterations may be made therein without departing from the spirit and scope of the invention as defined by the appended claims.

What is claimed is:

1. In a gas turbine engine a centrifugal filter assembly for removing contaminant particles from lubricating oil comprising:

a hollow shaft rotatably mounted in a gear box of the gas turbine engine, said hollow portion being axially divided into separate input and output passageways;

a cylindrical member closed at one end to form an interior chamber removably mounted on the shaft for rotation therewith;

a disc shaped gear fixed to the shaft for rotation therewith and removably secured to the cylinder member in a position causing a side face of the gear to form a closure for the interior chamber, said gear being operatively associated with a gear train of the gear box to rotatably drive the shaft; and a disc concentric with and fixedly secured to said shaft for rotation therewith, said disc being radially disposed within said chamber to divide said chamber into radially extending first and second channels and being spaced from the circumferential periphery thereof, to allow communication between said channels over the edge of the disc, said shaft openings connecting said input and output passageways with the first and second channels respectively in order to direct the flow of lubricating oil, in turn, from said input passageway radially outward, past the annular collection zone, and then radially inward to the output passageway.

2. A centrifugal filter for removing contaminant particles from lubricating oil as in claim 1 wherein said irregular, internal circumferential surface of the cylindrical member is defined by a screen abutting the internal circumferential surface of the cylindrical member.

3. A centrifugal filter for removing contaminant particles from lubricating oil as in claim 2 wherein a screen is provided in the annular collection zone.

4. A centrifugal filter for removing contaminant particles from lubricating oil as in claim 1 wherein a plurality of grooves are cut into the internal circumferential surface of the cylindrical member to define the irregular surface thereof.

* * * * *